INVENTOR

JAMES E. BRITT

BY Tipton D. Jennings

ATTORNEY

INVENTOR

JAMES E BRITT

BY Tipton D. Jennings

ATTORNEY

United States Patent Office 3,430,008
Patented Feb. 25, 1969

3,430,008
APPARATUS FOR TESTING A TELEPHONE CIRCUIT

James E. Britt, Fairfax County, Va., assignor to The Susquehanna Corporation, a corporation of Delaware Filed Oct. 24, 1965, Ser. No. 504,439
U.S. Cl. 179—175.1 6 Claims
Int. Cl. H04m 5/00

ABSTRACT OF THE DISCLOSURE

This apparatus monitors and indicates the make ratio and break ratio of pulses, either AC or DC, sent to or generated by telephone signaling equipment, such as a single-frequency (SF) unit. During AC operation the input to the monitoring circuit is by means of a transformer, the primary side of which is patched across the line undergoing test, enabling the monitoring of lines while they are in service. During DC operation, a high impedance load is placed in parallel with the telephone circuit and the voltage across the load provides the input. A keying circuit, isolated from the monitoring circuit, generates signal pulses which can be sent into the SF unit. By connecting the keying circuit to an input of the SF unit and the monitoring circuit into an output, the signal degradation due to the SF unit itself can be determined. Other combinations of connections of the keying circuit and the monitoring circuit with the SF unit permit testing of other isolated parts of the telephone trunk.

This invention relates to telephone test equipment. More particularly, this invention relates to method and apparatus for measuring the distortion of signaling pulses used to transmit a called telephone number.

Accuracy in the generation, transmission and reception of signaling pulses is essential to proper operation of a telephone system. The increased magnitude and complexity of the telephone network in use throughout the nation makes this accuracy of greater importance. In the days when a telephone subscriber dialed calls only within his local community and relied on a telephone company operator to place for him calls to other cities, less concern existed about the accuracy of signaling pulses. If a subscriber placed a local call and received a number other than that desired, he generally gave little thought to the matter and placed the call a second time. Unless he repeatedly received the wrong number, he was likely to assume he had made an error in dialing. In fact, he may have dialed wrong; or he may have dialed properly only to have an error introduced by the telephone equipment. With the advent of "direct distance dialing," whereby the subscriber dials for himself long distance calls to any part of the country, the problem of receiving wrong numbers has become more noticed. The subscriber is no longer willing to place the call a second time; he does not want to be billed for an expensive long distance call to an unknown telephone in a strange city. Thus, the frequency with which wrong numbers are received is now brought more vividly to the attention of the operating telephone companies, and it is desired to reduce their occurrence.

When a subscriber makes a local call, signals representing the number of the called telephone are generated and transmitted usually as direct current (D.C.) pulses. When a subscriber dials a long distance call, his telephone generates D.C. pulses representing the called number, and these are transmitted to a piece of telephone company equipment known as a single-frequency signaling unit (SF unit) in which they are converted into alternating current (A.C.) pulses for transmission to the distant city. In the distant city a second SF unit converts the A.C. signals back to D.C. pulses which then "select" the called telephone's line. This D.C.-to-A.C.-to-D.C. conversion is made because of the comparative economy of intercity transmission of A.C. signals relative to D.C. signals.

A variety of different single-frequency signaling units have been developed by the telephone industry. The requirements, main features, and method of operation of telephone systems utilizing SF units are outlined in Weaver and Newell, In-Band Single-Frequency Signaling, vol. 33, The Bell System Technical Journal, pp. 1309–1330, November 1954. A transistorized SF unit is described in Weaver, Transistorized Units for In-Band Signaling, vol. 38, Bell Laboratories Record, pp. 377–380, October 1960. The several types of SF units utilize a variety of frequencies for the A.C. signals. One of the more common and more successful is 2600 cycles per second (c.p.s.), and in the discussion to follow it will be assumed that it is in use, although other frequencies are equally usable.

In local calls each digit of the called number is represented by a group of D.C. current pulses; while on long distance lines, each digit is represented by a group of A.C. current pulses. For example, when a subscriber dials the digit "nine," a group of nine D.C pulses is generated by his telephone and is transmitted to the telephone company equipment. If a local call is being dialed, these nine pulses are sent to telephone equipment which utlimately selects the dialed telephone. If a long distance call is being dialed, the nine D.C. pulses are sent to an SF unit which converts them into nine pulses of 2600 c.p.s. current. The rate at which these nine pulses are generated will depend upon the telephone equipment in use. Generally, they are generated at a rate somewhere between seven pulses per second (p.p.s.) and thirteen p.p.s. A commonly found pulse rate in ten p.p.s., and that rate will be used in the present description, although other pulse rates are equally suitable. At a pulse rate of 10 p.p.s., each pulse has a period of 100 milliseconds (ms.). This 100 ms. pulse period consists of a time during which current is present and a time during which current is absent. In the local D.C. transmission, the current is present when the dialing contacts on the subscriber's telephone are closed, referred to as the "make" period. When the contacts are open, referred as the "break" period, no D.C. current is present. In the conversion to A.C., within the SF unit, these conditions are reversed, and there is A.C. current during the break period, but no current during the make period. Thus, each 100 ms. pulse period is divided into a make period and a break period. The ratio of the length of the make period to the length of the pulse period is called the make ratio, and the ratio of the length of the break period to the length of the pulse period is called the break ratio. These ratios are usually expressed as percentages and are collectively called the make/break ratio.

To enable the telephone switching equipment to recognize each discrete pulse in the representation of a digit requires that the pulse make/break ratio fall within limits which can be accepted by the switching equipment. A satisfactory break period has a duration of 50 to 70 milliseconds (ms.), and a satisfactory make period has a duration of 30 to 50 ms. Thus, at 10 p.p.s. the break ratio must between 50% and 70%, and the make ratio between 30% and 50%. Operation outside of these limits is likely to result in the telephone switching equipment being incapable of distinguishing the end of one pulse and the beginning of the next, causing one or more pulses to be lost. Thus, a nine might be read by the switching equipment as an eight, and consequently the wrong number connected to the calling line.

There are numerous possible sources of error in the generation, transmission, and reception of these signaling pulses. The contacts on the dial of the calling subscriber's telephone may operate improperly, resulting in too great or too small a make/break ratio. The make/break ratio can be affected by substandard performance of switching and terminating equipment, SF units, and line amplifiers. Capacitance inherent in the lines can also degrade the ac signaling pulses. While some of the telephone company equipment is capable of correcting the make/break ratio of the transmitted pulses, there are limits to the amount of correction possible. Thus, if some piece of equipment within the telephone trunk is introducing too much error in the make/break ratio, the other equipment will not be able to adequately correct it, and the terminating and switching equipment in the called city will improperly interpret the incoming signals, resulting in the connection of an incorrect line.

Determination of the particular piece of equipment which is introducing the excessive error into the signaling pulses requires a versatile piece of test equipment capable of monitoring both the DC pulses and the AC pulses. The easiest place to test both types of signals is at the SF units at either end of the intercity trunk. By monitoring the AC pulses while standard DC pulses are sent into the SF unit, the unit's transmitting circuitry can be tested; and, conversely, by monitoring the DC pulses sent out in response to standard AC pulses, the unit's receiving circuitry is checked. If the transmitting line is patched to the receiving line at some point in the trunk, then the effect of the line capacitance and the amplifiers along the line can be determined by monitoring the received AC pulses while standard AC pulses are transmitted. Thus, the SF unit is the most convenient location to perform tests.

If necessary, standard commercial long distance trunks can be taken out of operation and terminated in a piece of test equipment to determine the source of signal errors. Generally, enough long distance lines exist that one can be removed from operation for this purpose with no detrimental effect on customer service. However, many businesses lease long distance telephone lines on a full-time basis and require their uninterrupted use. It is not practical for the telephone company to remove such a line from service for testing. Instead, the line must be tested while available for operation, on an in-service basis.

While some conventional equipment is able to check DC pulses and other equipment can test AC pulses, the equipment generally available requires termination of the tested line in the test equipment, rather than being able to perform tests while the line is in service. The present invention is able to generate standard pulses, DC or AC, for transmission, and simultaneously to monitor received pulses while the tested line is in service. Thus, it fills a great need of the telephone industry for a piece of versatile test equipment capable of thoroughly testing dial pulse signaling circuits.

Accordingly, one object of the present invention is to provide improved test equipment capable of measuring and indicating the make/break ratio of both DC pulses and AC pulses.

Another object is to provide improved test equipment with which it is possible to test the signal handling capabilities of telephone lines while in service, as well as while terminated in the test equipment.

Another object is to provide improved test equipment capable of generating either DC pulses or AC pulses while simultaneously monitoring received DC pulses or AC pulses.

Still another object is to provide improved test equipment for use in conjunction with telephone company single-frequency signaling units to determine the sources of errors in telephone signaling pulses.

These and other objects and advantages are achieved in the subject invention.

Briefly, the invention in its preferred embodiment monitors and indicates simultaneausly the make ratio and the break ratio of pulses, either DC or AC, sent to or generated by the SF unit. During AC operation the input to the monitoring circuit is by means of a transformer, the primary side of which is patched across the line undergoing test, enabling the monitoring of lines while they are in service. During DC operation, a high impedance load is placed in parallel with the telephone circuit and the voltage across the load provides the input. A keying circuit, isolated from the monitoring circuit, generates signal pulses which can be sent into the SF unit. By connecting the keying circuit to an input of the SF unit and the monitoring circuit to an output, the signal degradation due to the SF unit itself can be determined. Other combinations of connections of the keying circuit and the monitoring circuit with the SF unit permit testing of other isolated parts of the telephone trunk.

The invention is more fully described in the following detailed description and the accompanying drawings, in which.

Figures 1, 2, 3:
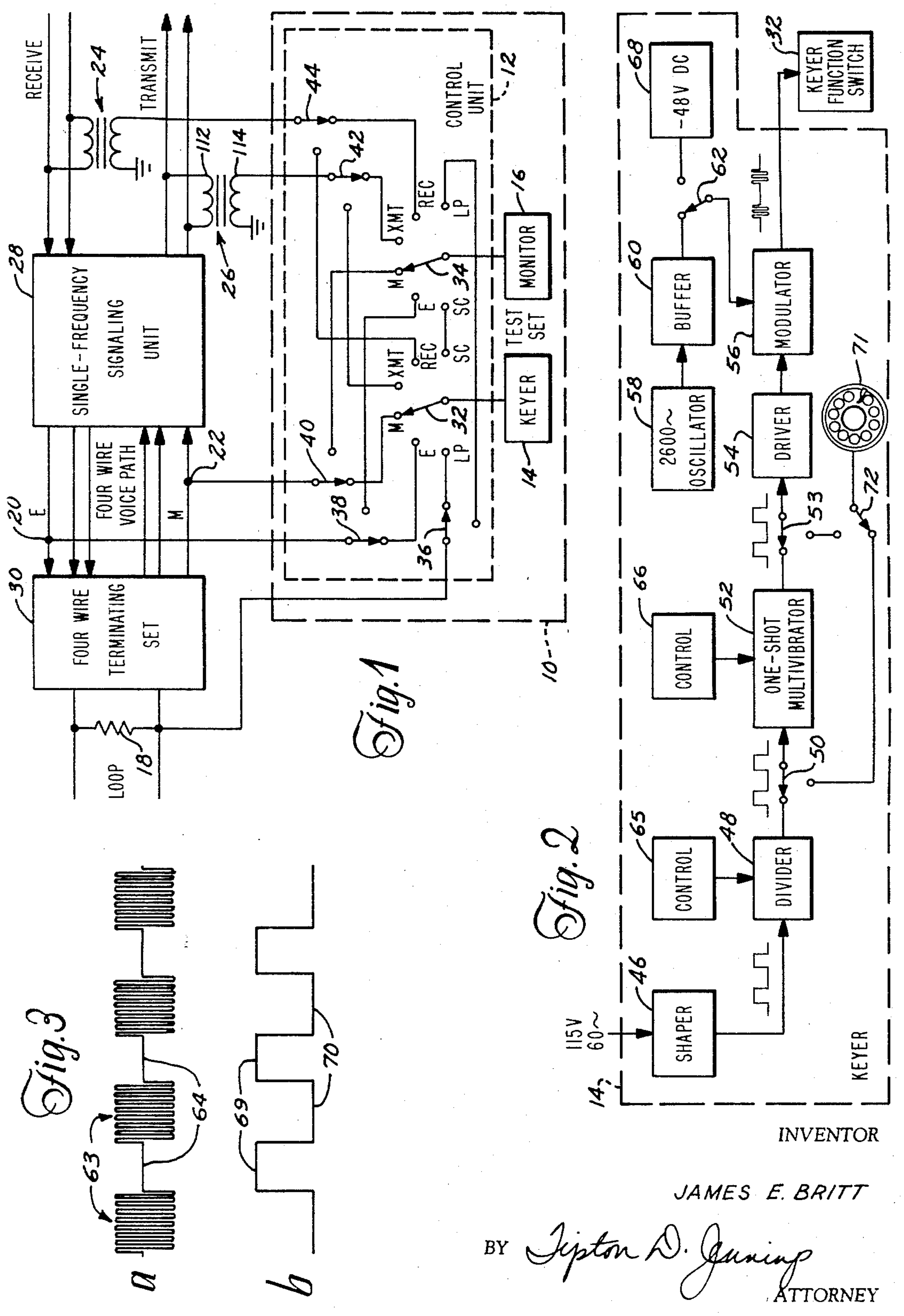
FIGURE 1 is a block diagram showing the subject invention together with telephone equipment to be tested.
FIGURE 2 is a block diagram of the keying circuit included in the subject invention.
FIGURE 3 is a representation of typical AC signaling pulses and DC signaling pulses generated by the present invention for use in testing a telephone system.

In FIGURE 1 the subject invention is shown as test set 10 comprising control unit 12, keyer 14, and monitor 16. While the various connections between the test set 10 and the loop, the E lead, the M lead, the receive lines, and the transmit lines of the SF unit 28, and the four-wire terminating set 30 are actually made at the various pieces of equipment, for ease of illustration they are shown in FIGURE 1 as external couplings or connections 18, 20, 22, 24, and 26, respectively. More detail on the actual method of making these connections will be described later in conjunction with FIGURE 5.

*Control unit*

Within test set 10, the keyer 14 is connected to keyer function switch 32 in control unit 12. Similarly the monitor 16 is connected to monitor function switch 34 in control unit 12. Each of the switches 32 and 34 has the following six positions, providing connections of the keyer and the monitor respectively to the corresponding six locations.

| Position: | Connection |
|---|---|
| E | "E" lead on which DC signals from SF unit are sent to the four-wire terminating set. |
| M | "M" lead on which DC signals from the four-wire terminating set are received by the SF unit. |
| XMT | "Transmit" lines on which AC signals from the SF unit are sent to a distant city. |
| REC | "Receive" lines on which AC signals are received by the SF unit from a distant city. |
| LP | "Loop" lines which connect the four-wire terminating set with the switching equipment within the local telephone office. |
| SC | Connects keyer **14** with monitor **16** within test set **10** to permit internal checking and calibration of the test set. |

Each of the five external locations must be accessible to both the keyer 14 and the monitor 16; therefore, each of the five external lines includes a control switch to determine whether that line is available to the keyer or to the monitor. These control switches are shown within control unit 12 as switches 36, 38, 40, 42, and 44 in the lines to the loop, the E lead, the M lead, the transmit line, and the receive line, respectively. Thus, the keyer 14 can be connected through the keyer function switch 32 to the loop via control switch 36, to the E lead via control switch 38, tot he M lead via control switch 40, to the transmit lines via control switch 42, or to the receive lines via control switch 44. Through the monitor function switch 34, the monitor 16 can be connected to any of these same locations via the same control switches.

In one mode of operation the keyer 14 sends signaling pulses into one part of the SF unit, and the monitor simultaneously receives signals from another location on the SF unit. This mode of use allows the determination of the effect caused by different parts of the telephone circuit on the signaling pulses. By way of example, FIGURE 1 shows the keyer 14 connected via switches 32 and 40 to transmit DC pulses through connection 22 to the M lead and thus into the SF unit 28. The monitor 16 is connected via switches 34 and 42 to connection 26, enabling it to monitor the AC pulses generated by the SF unit and sent on the transmit lines. This arrangement permits the test set 10 to monitor the ability of the SF unit to generate AC pulses in response to DC pulses, the same as would be received from the local office switching equipment. It is readily seen that numerous other combinations are possible. A further example is keying into the transmit lines via connection 26 and monitoring the receive lines via connection 24, with a patch at some distant location connecting the two sets of lines to enable evaluation of the distortive effect which any amplifiers in the telephone line and line capacitance have on the signaling pulses.

In addition, when both the keyer function switch 32 and the monitor function switch 34 are in the self-check position, the keyer 14 is connected to the monitor 16, and there is no connection with the external equipment. This enables the monitor to investigate the characteristics of the pulses generated by the keyer, and thereby to evaluate its own performance.

*Keyer*

The keyer 14 is capable of providing the wide variety of signals required for the complete testing of telephone dial pulse transmitting equipment. The preferred embodiment of keyer 14 is shown in FIGURE 2. In this embodiment the output from a 115 volt, 60 cycle per second (c.p.s.) power source is sent to a shaper 46 in which the since-wave input is converted to a 60 pulse-per-second (p.p.s.) square-wave output. This signal is then divided to 10 p.p.s. by a divider 48. The 10 p.p.s. square wave is sent via switch 50 to trigger a variable one-shot multivibrator 52 having a differentiating input (not shown). The output from the multivibrator is a series 10 p.p.s. pulses whose duration is dependent upon the multivibrator parameters. This output is sent via switch 53 to a driver 54 which controls a modulator 56. A carrier signal is sent to modulator 56 from a 2600 c.p.s. oscillator 58 via a buffer amplifier 60 and a switch 62. Thus the input to modulator 56 from driver 54 modulates the 2600 c.p.s. carrier signal from oscillator 58, resulting in a continuous pulse modulated 2600 c.p.s. output from keyer 14 which is sent to switch 32 in the control unit 12. FIGURE 3(*a*) depicts the waveform of this AC output from keyer 14. Each of the AC pulses 63 simulates the transmit output from the SF unit during a break period. The spaces 64 between pulses simulate the output during a make period.

While 10 p.p.s. is the pulse rate used in many telephone switching systems, other systems use other pulse rates. Control 65 permits selection of the desired output pulse rate by regulating the scaling factor of divider 48. The time duration of the output pulses of one-shot 52 is determined by control means 66 which varies the duration of the unstable state of one-shot 52. The control 66 allows a smooth variation of the one-shot output pulse duration and hence of the make-break ratio of the pulse output from keyer 14.

Switch 62 permits the modulator 56 to be connected to −48 v. DC from a source 68 rather than to the 2600 c.p.s. oscillator 58. With this connection, the output of the keyer 14 is a series of pulses of direct current with the pulse rate and pulse duration determined by controls 65 and 66 as previously described. FIGURE 3(*b*) depicts the DC pulse output from keyer 14. Each pulse 69 of direct current simulates a make period, while each period 70 of no current simulates the break period.

A telephone dial can be used to control the generation of pulses by keyer 14. This is accomplished by changing the position of switch 50 to connect a conventional telephone dial 71 by this switch and by switch 72 into the one-shot 52. The one-shot will generate a number of pulses corresponding to the digit dialed, rather than a continuous series of pulses. The pulse rate is dependent upon the dial 71; however, the pulse make/break ratio can be varied by control means 66.

By changing the positions of switches 72 and 53, the telephone dial 71 can be connected to the driver 54. The keyer 14 will then generate a number of pulses corresponding to the digit dialed, and both the pulse rate and pulse make/break ratio will be dependent upon the dial 71.

Each of the components within keyer 14 is a well-known conventional circuit. For example, shaper 46 can be a conventional Schmitt trigger. Divider 48 can be binary counter with its feedback arranged to give the appropriate counting base and having as control 65 a switch in the feedback loop to select the divisor or scaling factor to determine the output pulse rate. One-shot 52 is a conventional monostable multivibrator with control 66 being a variable resistor in the RC timing circuit. Driver 54 and modulator 56 may be a relay driver and a relay, respectively, or alternatively, a buffer amplifier and a transistor modulator, respectively. Oscillator 58 can be a crystal controlled oscillator. Other equivalent components can of course be substituted for these.

*Monitor*

Figure 4:
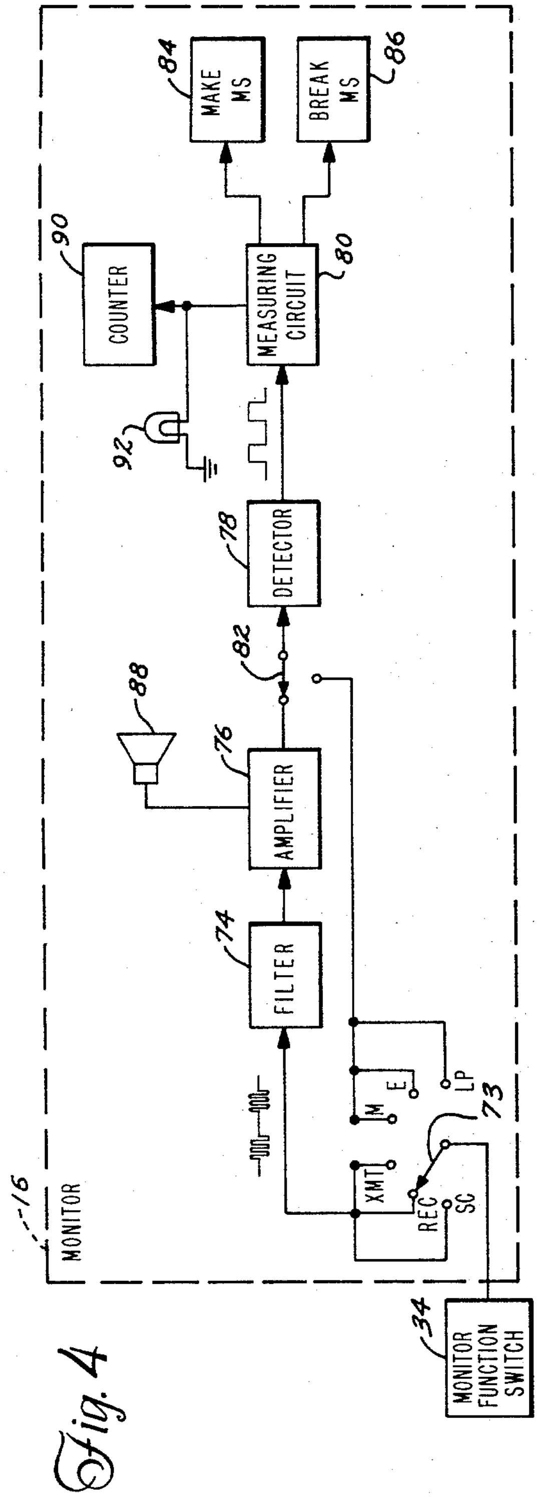
FIGURE 4 is a block diagram of the monitoring circuit included in the subject invention.

The monitor 16 is capable of detecting and measuring the pulse signals. As seen in FIGURE 4, the monitor 16 receives the pulse signals from the monitor function switch 34 within control unit 12. Two paths are provided, depending upon the signal characteristics. The AC pulses from the receive lines; the transmit lines and the self-check positions are sent through a switch 73, operated in tandem with the monitor function switch, to filter 74 in which high-frequency noise is removed. The filter is connected to amplifier 76 for amplifying the incoming signal. The signal is then passed to detector 78 which demodulates it and sends to the measuring circuit 80 a series of DC pulses which in pulse rate and pulse duration correspond to the received AC pulses.

The input to the detector 78 is connected to a switch 82. When AC pulses are being monitored, switch 82 is connected to amplifier 76, as shown. When the monitor is used for measuring DC pulses, as from the E lead, the M lead, or the loop, switch 82 is changed to its second position, and a direct path from switch 73 to detector 78 is provided for the DC pulse input. The detector 78 then removes noise from the received DC pulses and passes them to the measuring circuit 80. The output of the measuring circuit 80 is read on two meters 84 and 86, which are calibrated respectively to show in milliseconds the length of the shortest make period and the shortest break period of the pulse train applied to measuring circuit 80.

The measuring circuit 80 is a solid-state device capable of measuring the dial pulse make period and break period, as represented by the DC pulses. One such device for measuring pulse length is disclosed in U.S. Patent No.

3,084,220, which is assigned to the same assignor as the present invention and which shows a short-pulse measuring circuit. This short pulse measuring circuit measures the incoming break periods and make periods and compares the shortest of each of these sets of periods with a standard or unit length period. The standard utilized in the present application is the total pulse period. Thus, at 10 p.p.s., each break period and each make period is compared with a 100 ms. standard, and the lengths of the shortest break period and of the shortest make period are indicated.

A number of accessories can be added to the monitor 16 to facilitate testing. A speaker 88 can be connected to the amplifier 76 for use when AC pulses are being monitored. The break period of each received pulse will then cause a short burst of 2600 c.p.s. tone to emanate from the speaker 88. A digital counter 90 can be attached to the measuring circuit 80 to count the pulses received. Thus, comparison of the number of pulses transmitted with the number received will disclose whether distortion of the pulses is causing some piece of switching equipment to miss one or more pulses in a series. In addition, an indicator light 92 in parallel with the counter will blink with each pulse, giving a visual indication of receipt.

*Connections*

Figure 5:
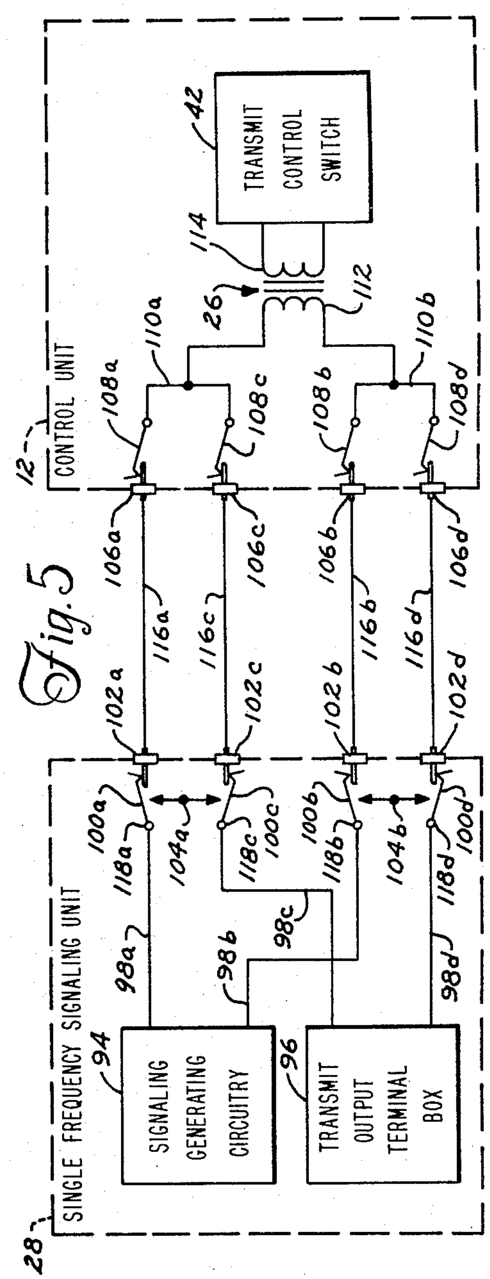
FIGURE 5 is a schematic representation of the means for connecting the subject invention with a single-frequency signaling unit in an in-service configuration.

FIGURE 5 depicts schematically the method by which the test set 10 is connected with an SF unit 28 in an "in-service" configuration, thus eliminating the requirement that the telephone trunk be taken out of service and terminated in the test set. The signal generating circuitry 94 within SF unit 28 receives DC pulses sent into the SF unit on the M lead and in response generates AC pulses of the type shown in FIGURE 3(*a*) for transmission over the transmit lines. Circuitry 94 is connected to the transmit output terminal box 96 within the SF unit 28 by the following two paths; two conductors **98*a* and 98*b* connect circuitry 94 with two movable contacts 100*a* and 100*b* adjacent two test jacks 102*a* and 102*b* on the SF unit 28; two stationary contacts 104*a* and 104*b* jumper these two movable contacts 100*a* and 100*b* to two more movable contacts 100*c* and 100*d* adjacent another set of test jacks 102*c* and 102*d*; the second set of movable contacts 100*c* and 100*d* are connected via two conductors 98*c* and 98*d* to the output terminal 96**.

Test set 10 has input circuitry associated with each of its input points leading to the five control switches within control unit 12. Associated with the transmit control switch 42 are four input points **106*a*, 106*b*, 106*c*, and 106*d* connected respectively to four stationary contacts 108*a*, 108*b*, 108*c*, and 108*d*. Within the test set 10 contacts 108*a* and 108*c* are connected together by jumper 110*a*; and contacts 108*b* and 108*d* are connected together by jumper 110*b*. Transformer 26 connects the input points 106 to transmit control switch 42. The transformer primary 112 is connected between the jumper 110*a* and the jumper 110*b*. The transformer secondary 114 is connected to switch 42**.

To monitor the transmit output of SF unit 28 with test set 10, four test cords **116*a*, 116*b*, 116*c*, and 116*d* are used to connect the test jacks 102*a*, 102*b*, 102*c*, and 102*d* on the SF unit 28 to input points 106*a*, 106*b*, 106*c*, and 106*d*, respectively, on the test set 10. When the test cords 116 are inserted into the test jacks 102 on the SF unit 28, they cause the four movable contacts 100 to rotate about pivots 118*a*, 118*b*, 118*c*, and 118*d*, breaking the connections with the stationary contacts 104. The signal generating circuitry 94 is still connected to the transmit line output point 96. The two connections are now by means of conductors 98*a* and 98*b*, movable contacts 100*a* and 100*b*, test cords 116*a* and 116*b*, stationary contacts 108*a* and 108*b*, jumpers 110*a* and 110*b*, stationary contacts 108*c* and 108*d*, test cords 116*c* and 116*d*, movable contacts 100*c* and 100*d* and conductors 98*c* and 98*d***.

Because the transformer primary 112 is connected between the stationary contact jumpers **110*a* and 110*b*, the primary 112 is in parallel with the load equipment on the transmit line. Direct current pulses into the SF unit 28 via its M lead (FIGURE 1) will cause a pulsed AC output on the transmit line which will be simultaneously passed via transformer 26 to the circuitry within test set 10. Thus, the test set 10 is able to monitor the performance of SF unit 28 while it is in operation. Similarly, the keyer 14 can pulse into either the transmit lines or the receive lines via transformer 26 or 24**.

The same method is used and similar equipment is supplied within the control unit 12 for the other connections. The DC monitoring and keying of the E lead, the M lead, and the loop connections are accomplished by a similar method, in which a high impedance resistive load, such as resistor 18 FIGURE 1, is used in place of the transformer 26, and the voltage is monitored or is impressed across the resistor 18.

Numerous minor modifications can be made to the design of the test set 10. For example, shaper 46, divider 48 and control 65 within keyer 14 can be replaced by one clock unit employing a unijunction transistor oscillator circuit to generate triggering pulses for one-shot 52 at a selectable rate. The DC input signals to monitor 16 can be introduced to the measuring circuit 80 instead of to detector 78, if noise in the signals is insufficient to present a problem. A time delay can be added to detector 78 to require that signals be present for perhaps five milliseconds before the detector will operate, thus preventing brief spurious signals from actuating the equipment. Dial 71 can be connected to one-shot 52 or driver 54 by means of a plug and movable contacts adjacent an input jack, as described in conjunction with FIGURE 5, rather than by means of switches 50, 53, and 72.

Although this invention has been described with reference to illustrative embodiments thereof, it will be apparent to those skilled in the art that the principles of this invention can be embodied in other forms but within the scope of the claims.

What is claimed is:

1. A device for testing a telephone circuit comprising in combination:

(1) a pulse generator for generating pulses and having means for controlling the pulse period and the make/break ratio of the produced pulses;

(2) a modulating network, a source of carrier signal, said modulating network being connected to said pulse generator to produce an output of said carrier signal modulated by the pulses from said pulse generator;

(3) a detector for producing a series of direct-current pulses in response to applied pulses, each pulse in said series occurring in response to an applied pulse, each pulse produced having its amplitude and make/break ratio determined by its corresponding applied pulse;

(4) measuring and indicating means electrically connected to said detector for measuring and indicating the break period and the make period of said direct-current pulses in said series; and (5) control means for electrically connecting the output of said modulating network to a first selected point in said telephone signaling circuit and for electrically connecting the input to said detector to a second selected point in said telephone signaling circuit, so that said modulating network transmits pulses of known pulse period and make/break ratio into said first selected point and said detector simultaneously receives pulses from said second selected point.

2. Test equipment for use with a telephone single frequency signaling unit comprising the combination of:

(1) a keying circuit comprising:

(a) signal generation means for simulating a plurality of telephone signaling currents, said signaling currents having make portions and break portions, and (b) signal control means electrically connected to said signal generation means for selecting one of said plurality of signaling currents to be simulated;

(2) a monitoring circuit for monitoring received telephone signaling currents, said monitoring circuit comprising;

(a) detector means for converting received telephone signaling pulses of a given magnitude and duration into proportional direct current pulses of like duration, (b) means for measuring the make portions and the break portions of said direct current pulses; and (c) indicating means electrically connected to said measuring means for indicating the make portions and the break portions of said direct current pulses; and (3) first means for electrically connecting the keying circuit to said single frequency signaling unit to apply telephone signaling currents thereto and second means for electrically connecting the monitoring circuit to said single frequency unit to receive telephone signaling currents therefrom.

3. A device for testing a telephone circuit comprising in combination:

(1) a keying unit for generating standard pulses for transmission via said telephone circuit, comprising;

(a) triggering means for generating triggering pulses at a controllable pulse rate, (b) a monostable multivibrator electrically connected to said triggering means for generating modulating pulses, one of said modulating pulses occurring in response to each of said triggering pulses, so that each of said modulating pulses has a pulse period equal to the interval between said triggering pulses, each of said modulating pulses having a make period and a break period, said multivibrator including control means to control the make/break ratio of said modulating pulses, (c) a carrier signal source, and (d) a modulator electrically connected to said carrier signal source and to said multivibrator, said modulator producing a pulse of carrier signal in response to each modulating pulse, each carrier signal pulse having a duration and a make/break ratio equal to the duration and the make/break ratio of its corresponding modulating pulse;

(2) a monitor unit for receiving pulses from said telephone circuit and for determining the duration of the make period and the break period of said received pulses comprising;

(a) a detector for generating in response to received pulses a series of direct-current pulses, each pulse having a make period and a break period, each of said generated direct-current pulses having a make/break ratio equal to the make/break ratio of its corresponding received pulse and having an amplitude proportional to the amplitude of its corresponding received pulse, (b) a measuring circuit electrically connected to said detector to receive said series of direct-current pulses therefrom for measuring the duration of the pulse make periods and of the pulse break periods, and (c) indicating means for indicating the make period of the pulse having the shortest make period from said series of direct-current pulses and for indicating the break period of the pulse having the shortest break period from said series of direct-current pulses;

(3) a control unit connected to said keying unit and to said monitor unit for electrically connecting said keying unit to a first selected point in said telephone circuit and for electrically connecting said monitor unit to a second selected point in said telephone circuit, so that said keying unit transmits said standard pulses into said first selected point and said monitor unit simultaneously receives pulses from said second selected point.

4. Equipment for testing the signal-handling capabilites of telephone signaling equipment comprising in combination:

(1) a keying circuit comprising:

(a) a first pulse generator connected to a voltage source for generating a series of voltage pulses having a controllable repetition rate, (b) a second pulse generator for receiving said series and generating a modulating pulse of controllable duration in response to each pulse of said series, (c) an alternating current carrier signal source, (d) a direct current carrier signal source, (e) a modulating network for receiving pulses from said second pulse generator, said modulating network including control means to connect said modulating ntework to a selected one of said carrier signal sources, said modulating network modulating said selected carrier in response to each modulating pulse from said second pulse generator, and (f) control means for selecting

[1] the repetition rate of said series of pulses, and

[2] the make/break ratio of said modulating pulses;

(2) a monitoring circuit for testing received pulses comprising;

(a) means for converting pulses selected from received pulses of alternating current or received pulses of direct current into a direct current pulse train, (b) means electrically connected to said converting means for measuring the make period and the break period of pulses in said pulse train, (c) display means comprising;

[1] means for indicating the make ratio of that pulse in said pulse train with the lowest make ratio,

[2] means for indicating the break ratio of that pulse in said pulse train with the lowest break ratio,

[3] a counter for indicating the number of pulses received by said monitoring circuit; and (3) means for electrically connecting the keying circuit to said telephone signaling equipment to apply pulses thereto and means for electrically connecting the monitoring circuit to said telephone signaling equipment to receive pulses therefrom.

5. A device for testing the pulse-handling capabilities of a telephone signaling circuit, while the circuit is available for the performance of telephone signaling functions, comprising, in combination:

(1) a keying unit, for generating standard pulses for transmission via said telephone signaling circuit, comprising;

(a) a wave shaper connected to an electrical power source for generating electrical pulses therefrom, (b) a pulse rate regulator connected to said wave shaper to regulate the rate at which pulses are generated, (c) a monostable multivibrator having an input and an output, said input being adapted to receive electrical pulses, said multivibrator producing one output pulse in response to each received input pulse, said multivibrator including regulating means to regulate the duration of said output pulse, (d) first, second, and third control means, each control means hiving a first position and a second position, (e) a telephone dial having an output and capable of producing a series of electrical pulses, (f) a modulating network having an output and a first input for reception of modulating pulses and a second input for reception of a carrier signal, and (g) a plurality of carrier signal sources, each having an output, (h) said first control means connected to said multivibrator input so that when said first control means is in its first position said multivibrator input is connected to said voltage shaper, and when said first control means is in its second position said multivibrator input is connected to said second control means, (i) said second control means connected to said telephone dial output so that when said second control means is in its first position said dial output is connected to said first control means and when said second control means is in its second position said dial output is connected to said third control means, (j) said third control means connected to said first input of said modulating network so that when said third control means is in its first position, said first input is connected to said multivibrator output, and when said third control means is in its second position, said first input is connected to said second control means, thus permitting said multivibrator input to be selectively connected to said wave shaper output or to said telephone dial output to receive pulses from said selected output, and permitting said first input of said modulating network to be selectively connected to said multivibrator output or to said telephone dial output to receive modulating pulses from said selected output, (k) a fourth control means connected to said second input of said modulating network and having a number of positions equal to the number of said carrier signal sources, so that said second input may be connected to a selected one of said carrier signal sources, (l) said modulating network producing an output of said selected carrier signal modulated by said selected modulating pulses;

(2) a monitor unit, for receiving pulses from said telephone signaling circuit and for determining the duration of the make period and the break period of said recieved pulses, comprising;

(a) an electrical filter for removal of high-frequency noise from received pulses applied thereto, (b) an amplifier having its input connected to said filter to accept pulses therefrom, said amplifier adapted to amplify said accepted pulses and to apply said amplified pulses to its output, (c) a detector for generating a series of direct current pulses, one direct-current pulse being generated for each applied pulse, each generated pulse having a make period equal to the make period of its corresponding applied pulse and an amplitude proportional to the amplitude of its corresponding applied pulse, (d) a control means for determining whether said received pulses are applied to said electrical filter or to said detector and for determining whether said detector is adapted to accept said received pulses directly or to accept pulses from said amplifier, (e) a measuring circuit connected to receive said series of direct-current pulses from said detector for measuring the make period and the break period of each pulse in said series, and (f) indicating means electrically connected to said measuring circuit to indicate the make period of that pulse in said series of DC pulses having the shortest make period and for indicating the break period of that pulse in said series of DC pulses having the shortest break period:

(3) control means for connecting the keying unit to said telephone signaling circuit to apply a pulse-modulated carrier signal thereto and for connecting the monitor unit to said telephone signaling circuit to receive pulses therefrom, said control means comprising;

(a) input/output means including an impendance shunting said telephone signaling circuit, and (b) switching means associated with said keying unit, said monior unit, and said input/output means for selectively controlling the electrical interconnections between said input/output means, said keying unit, and said monitor unit.

6. Test equipment as claimed in claim 2 wherein said first and second connecting means each include individual switching means for selecting points in said single frequency signaling unit for respectively applying and receiving telephone signaling currents.

No references cited.

KATHLEEN H. CLAFFY, *Primary Examiner.*

ARTHUR A. McGILL, *Assistant Examiner.*